US007769831B2

(12) United States Patent
Johnson

(10) Patent No.: US 7,769,831 B2
(45) Date of Patent: Aug. 3, 2010

(54) SYSTEM AND METHOD FOR SAS PHY DYNAMIC CONFIGURATION

(75) Inventor: Stephen B. Johnson, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 1530 days.

(21) Appl. No.: 11/086,929

(22) Filed: Mar. 22, 2005

(65) Prior Publication Data
US 2006/0230125 A1 Oct. 12, 2006

(51) Int. Cl.
G06F 15/16 (2006.01)
G06F 15/177 (2006.01)
G06F 13/00 (2006.01)
(52) U.S. Cl. .................. 709/220; 709/245; 711/114
(58) Field of Classification Search ............... 709/220, 709/227, 245; 711/114
See application file for complete search history.

(56) References Cited

U.S. PATENT DOCUMENTS

2003/0184902 A1* 10/2003 Thiesfeld .................. 360/48
2005/0080881 A1* 4/2005 Voorhees et al. ............ 709/220
2005/0138261 A1* 6/2005 Marushak et al. ........... 710/316

OTHER PUBLICATIONS

Serial Attached SCSI Phy Layer; Rob Elliott; HP Industry Standard Servers, Server Storage Advanced Technology, elliott@hp.com, http://www.hp.com; Sep. 30, 2003.

* cited by examiner

*Primary Examiner*—Vivek Srivastava
*Assistant Examiner*—Tanim Hossain
(74) *Attorney, Agent, or Firm*—Suiter Swantz pc llo

(57) ABSTRACT

The present invention is directed to a system and method for SAS PHY dynamic configuration which allows for attaching SAS devices having various width ports. Each PHY is configured to be a narrow port internally to the controller while PHYs for the attached device is configured to be a wide port externally to the controller. As such, new SAS devices may be attached without any external controller intervention to reconfigure PHYs to match the new SAS devices. The present invention may allow for the flexibility of designing a single initiator solution that can adapt to any number of SAS devices with any number of port widths. Additionally, the present invention allows for a single product to be released that can automatically adjust to a broad range of SAS solutions and SAS topologies.

5 Claims, 4 Drawing Sheets

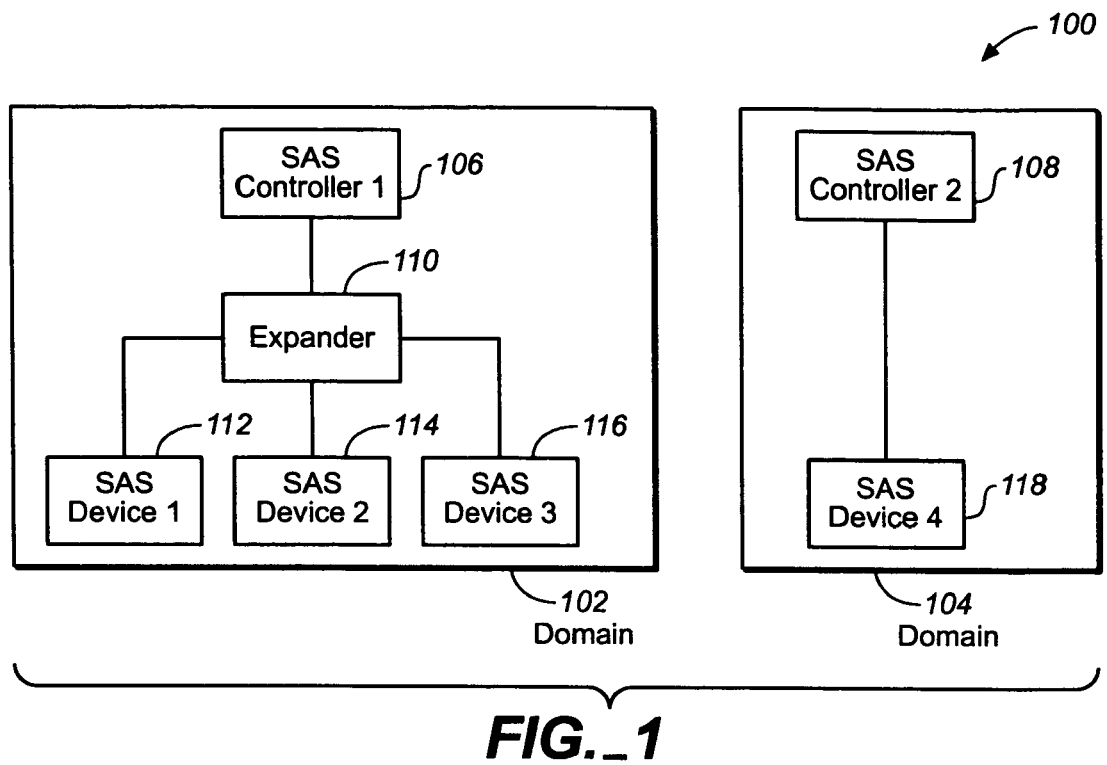
FIG._1
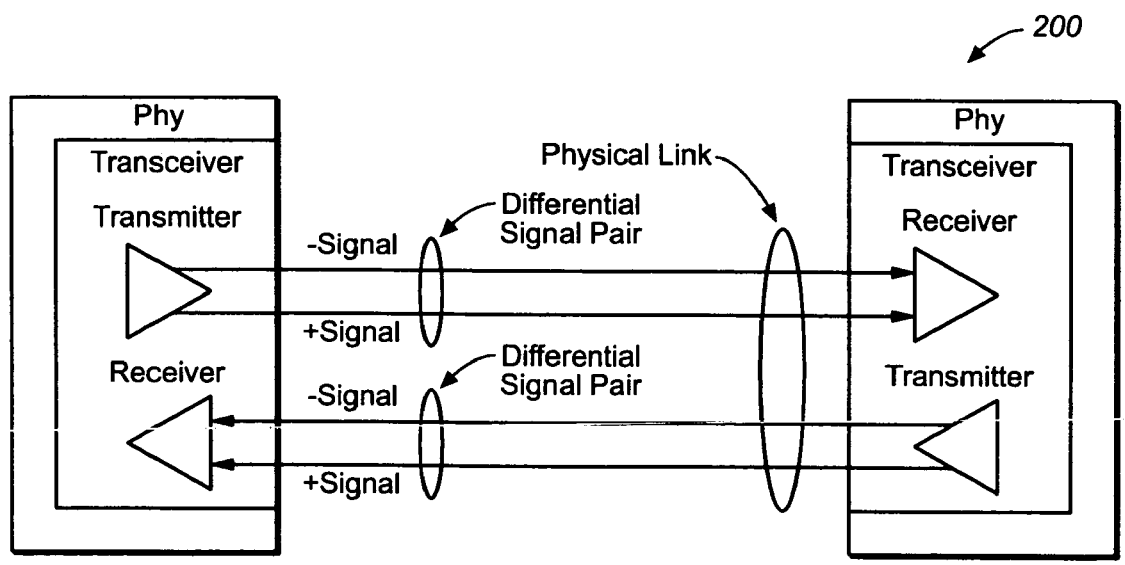
FIG._2

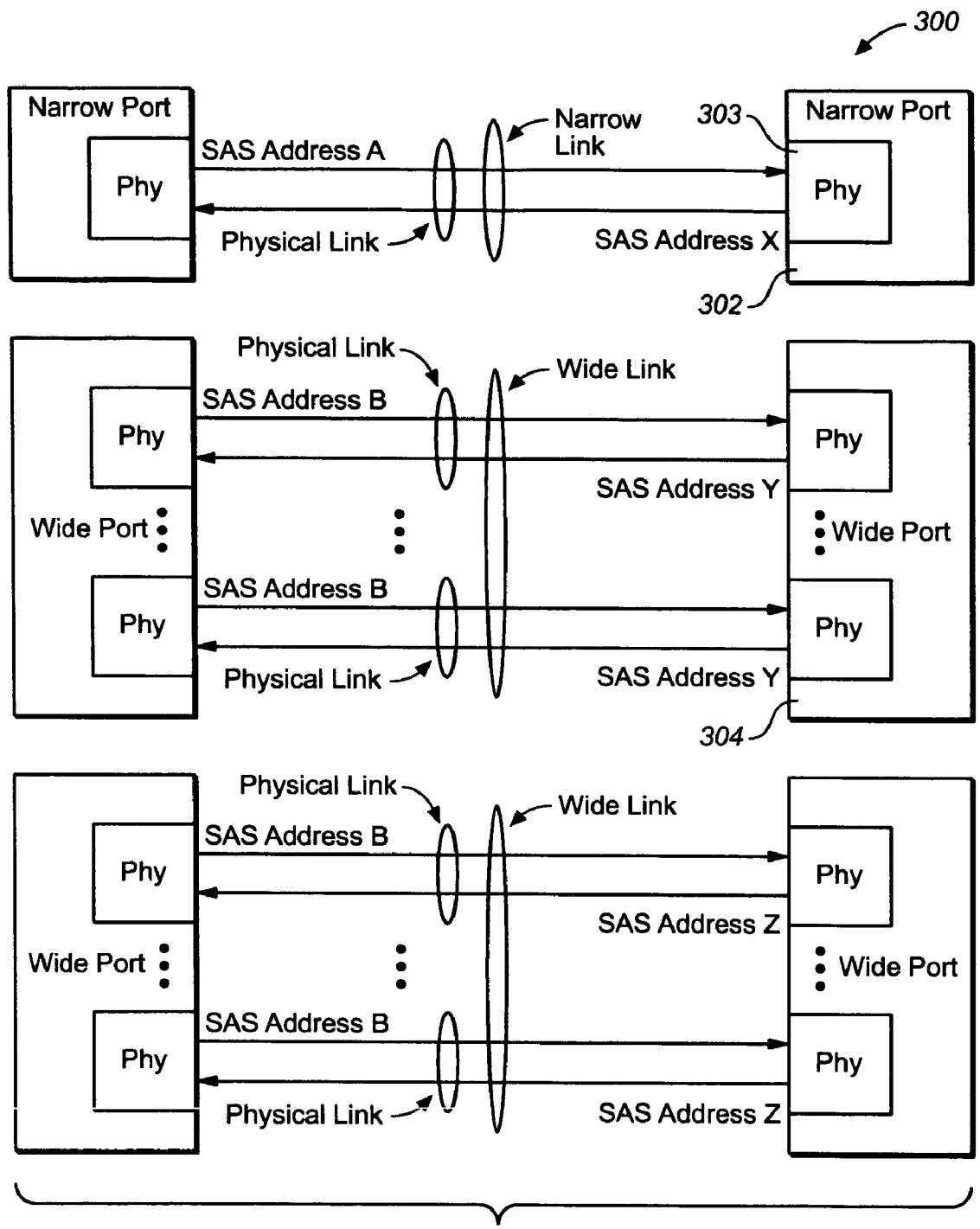
FIG._3

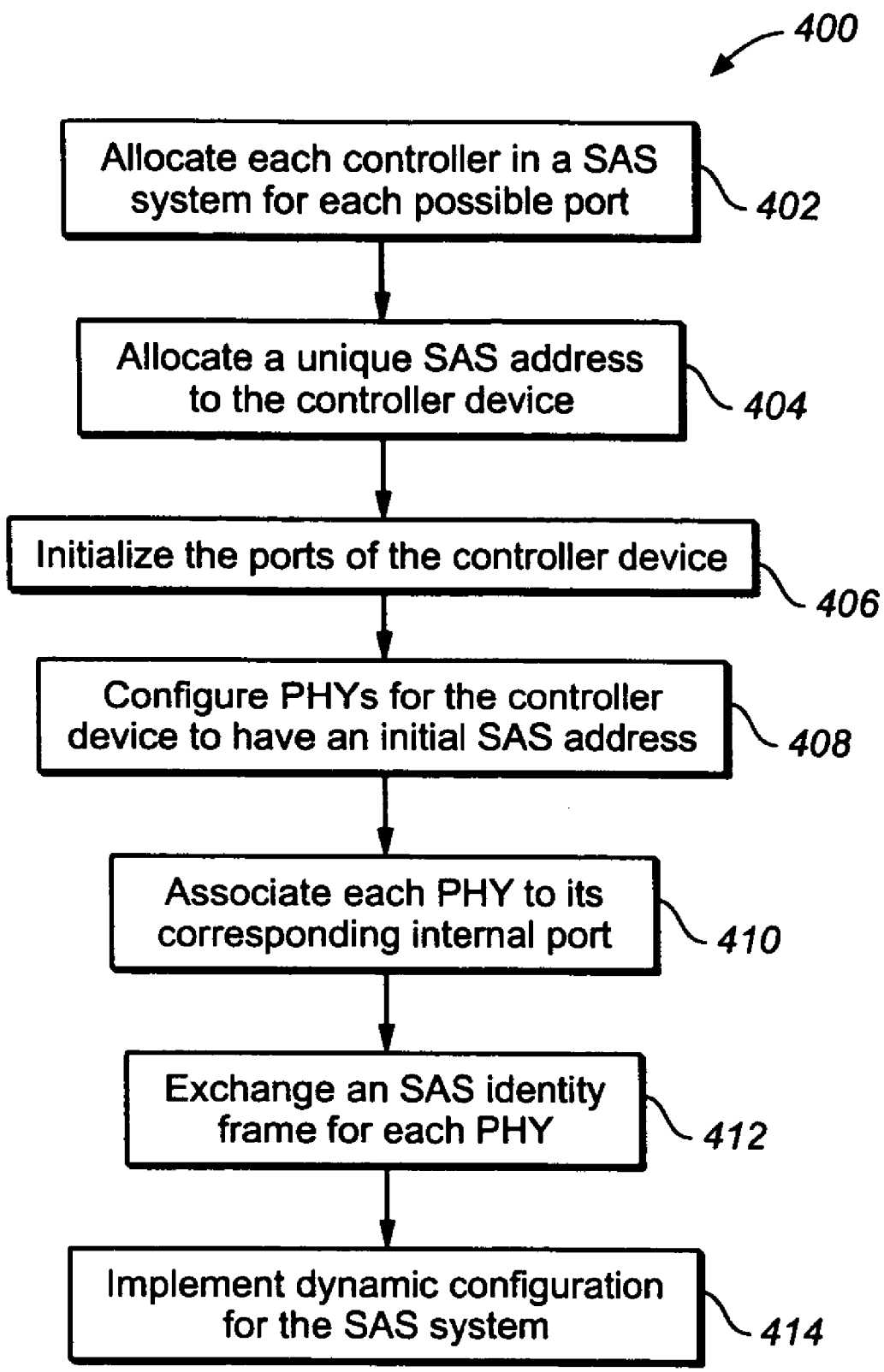
FIG._4

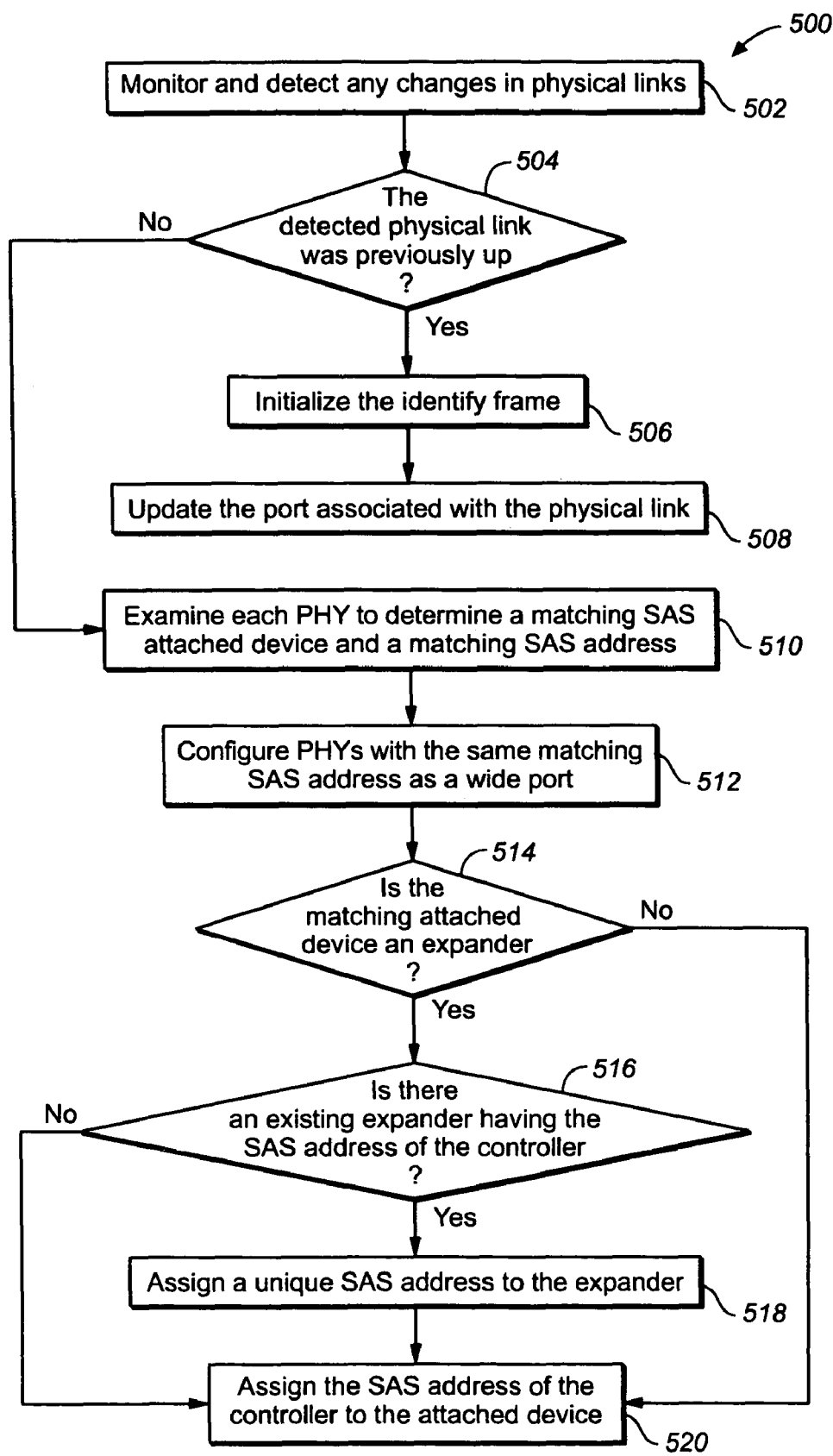
FIG._5

SYSTEM AND METHOD FOR SAS PHY DYNAMIC CONFIGURATION

FIELD OF THE INVENTION

The present invention generally relates to the field of small computer system interface and particularly to physical layer control (PHY) dynamic configuration of a serial attached small computer system interface (SCSI) system.

BACKGROUND OF THE INVENTION

Most IT departments in today's corporate world face growing user demands and shrinking budgets. Thus, storage vendors desire to develop cost efficient low-end systems with value-added features and availability levels typically found usually in enterprise class facilities. An exemplary system may be a serial attached SCSI (SAS) system.

SAS was developed as the evolutionary replacement for parallel SCSI (SCSI capable of supporting Serial ATA). SAS was envisioned to become the universal interconnect technology for mid-range and enterprise storage systems supporting multiple applications and deployment models and negating the need for multiple incompatible storage infrastructures. SAS provides high-end enterprise features (such as Fibre Channel, or the like), as well as the ability to support low-end desktop type storage media devices (such as Serial ATA, or the like).

Each SAS device contains one or more ports which may be a narrow port or a wide port. A wide port is created when there is more than one PHY in the port. A narrow port is created when there is only one PHY in the port. A PHY is a transceiver that electrically interfaces with a physical link combined with the portions of the protocol that encodes data and manages the reset sequences. Generally, PHYs are preconfigured to corresponding ports and do not change when different width port devices or expanders have been attached. Pre-configuration of ports does not allow for a flexible generic design and requires external controller intervention to reconfigure the PHYs to match the attached SAS end device or the attached expander.

Therefore, it would be desirable to provide a method to dynamically configure SAS PHYs to match the attached device port width.

SUMMARY OF THE INVENTION

Accordingly, the present invention provides a system and method for SAS PHY dynamic configuration whereby devices having different width ports can be attached to a SAS system.

In an exemplary aspect of the present invention, a method for implementing dynamic PHY configuration in a SAS system is provided. The SAS system may include a controller, and several SAS devices coupled to the controller. Each possible port may be allocated to the controller. A unique SAS address may be assigned to the controller. The allocated ports of the controller may be initialized. Each PHY for the controller may be configured to have a base SAS address (an initial SAS address). The PHYs may be associated with their corresponding internal ports. Then, the PHYs may be enabled by exchanging an identify frame for each PHY. A matching attached SAS device and a matching SAS address may be determined for each PHY. Before assigning an SAS address to the attached SAS device, the method may determine whether the attached device is an expander or an end device. If the attached SAS device is an expander, a unique SAS address may be assigned to the attached SAS device as long as there is an existing expander having the same SAS address of the controller. Otherwise, the SAS address of the controller may be assigned to the attached SAS device. If the attached SAS device is an end device, a SAS domain may be made with the attached SAS device and the controller.

In an additional aspect of the present invention, any changes in physical links may be monitored. Upon detection of the changes in physical links, PHYs may be configured accordingly. When a physical link is detected to be down, the method may determine whether the physical link was previously up. If the link was previously up, the identify frame for the physical link may be initialized since the physical link is down. If the ports associated with the physical link have no attached SAS device, the base SAS address may be assigned to the ports.

In a further aspect of the present invention, each PHY is configured to operate as a narrow port internally to the controller. Each PHY for the attached device is configured to operate as a wide port externally to the controller. As such, new SAS devices may be attached without any external controller intervention to reconfigure PHYs to match the new SAS devices. A maximum number of the attached SAS devices may be determined by a maximum port width of the controller.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a schematic diagram illustrating an SAS system environment in accordance with an exemplary embodiment of the present invention;

FIG. 2 is a schematic diagram illustrating exemplary physical layer controls;

FIG. 3 is a schematic diagram illustrating narrow ports and wide ports;

FIG. 4 is a flow diagram of a method for initializing the SAS system to implement dynamic PHYs configuration in accordance with an exemplary embodiment of the present invention; and FIG. 5 is a flow diagram of a method for implementing dynamic PHYs configuration in the SAS system in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

The present invention provides a system and method for SAS PHY dynamic configuration which allows devices with various width ports to be attached to a SAS system. The present invention may avoid problems associated with conventional pre-configuration of ports such as requiring external controller invention, inflexible SAS system design, or the like.

In the following description, numerous specific descriptions are set forth in order to provide a thorough understanding of the present invention. It should be appreciated by those skilled in the art that the present invention may be practiced without some or all of these specific details. It is to be noted that various SAS specifications described in the present invention conform to American National Standards Institute (ANSI) X3T10 standards. In some instances, well known process operations have not been described in detail in order not to obscure the present invention.

Serial Attached SCSI (SAS) is a storage interface developed to meet needs of enterprise-class storage applications to overcome drawbacks of parallel SCSI bus interface. SAS supports point to point architecture which establishes a direct link from a transmitting device to a receiving device and/or with a switching matrix. The switching matrix in a SAS domain is called an expander.

Referring now to FIG. 1, a schematic diagram of an SAS system environment 100 is depicted. The SAS system 100 may include several SAS domains 102, 104 each of which may include at least one SAS device 112-118 coupled to a controller 106, 108. The SAS system 100 may include an expander as a switching matrix in a SAS domain. For example, the SAS domain 102 includes the SAS controller 106 coupled to an expander 110 and the SAS devices 112-116 coupled to the expander 110.

Each SAS device 112-118 in the SAS domains 102, 104 may contain one or more SAS ports (not shown) which may be a narrow port or a wide port. A wide port is created when there is more than one PHY (physical layer control) in the port. A narrow port is created when there is only one PHY in the port. SAS devices connect to an expander across physical links attached to ports on the device and the expander. The point to point architecture in a SAS system may be a physical link (i.e. layer 1 for SAS interface) which includes a physical layer control (PHY) and a physical layer medium.

FIG. 2 is a schematic diagram illustrating an exemplary physical link 200 connecting two SAS devices. The physical link 200 includes a set of four signal lines used as two different pairs (i.e. two PHYs). A PHY includes a transceiver that electrically interfaces with a physical link combined with the portions of the protocol which encodes data and manages the reset sequences. Each port contains one or more PHYs while each port has a unique SAS address. It is to be noted that a port is created when one more PHYs share the same address and attach to a device through one or more physical links. Each PHY in a SAS device has a PHY identifier unique within the SAS device. Similarly, each PHY in an expander device has a PHY identifier unique within the expander device.

FIG. 3 is a schematic diagram depicting narrow ports and wide ports. Conventionally, a wide port 304, 306 is created when there is more than one PHY in the port. A narrow port 303 is created when there is only one PHY in the port. A set of PHYs with matching SAS addresses attached to another set of PHYs with matching SAS addresses. For example, if the wide port 304 has SAS address Y, then PHYs for the wide port 304 will have SAS address Y. The wide port 304 may attach to the wide port 306 which has matching SAS address B. PHYs in the wide port 304 have SAS address B.

FIG. 4 is a flow diagram of a method 400 for initializing the SAS system before implementing PHY dynamic configuration. The method 400 may include steps as follows. During initialization time, each possible port may be allocated to each controller in the SAS system 402. A unique SAS address may be assigned to each controller 404. Ports of each controller may be initialized 406.

All PHYs of a controller may be configured to have an initial SAS address (a base SAS address) 408. Each PHY may be associated with its corresponding internal port 410. Accordingly, the controller may operate each PHY as if each PHY creates a narrow port. Then, SAS identify frames for each of the PHYs is exchanged in order to enable each of the PHYs 412. For example, the SAS identify frame specifies protocol information such as Serial SCSI Protocol (SSP), STP, and/or SMP information, PHY identifier information, SAS address information, and the like. Since the same SAS address has been initially assigned to each of PHYs, an attached device may operate as if the PHYs create a single wide port. A dynamic configuration for the SAS system may be implemented 414. It is well known to the art that each device shall have a unique SAS address per SAS port.

Referring now to FIG. 5, a flow diagram of a method 500 for implementing dynamic PHY configuration in accordance with an exemplary embodiment of the present invention is shown. In step 502, the controller firmware may monitor and detect any changes in physical links of its ports. Upon detection of a physical link down, whether the physical link was previously up (i.e. whether the physical link was in operation) may be determined in step 504. Identify frames for PHYS associated with the physical link may be initialized to zero if no device is attached in Step 506. In step 508, the port associated with the physical link may be updated. For example, the base SAS address may be assigned to the port if there is no device attached to the port. In this manner, the port may be configured to associate an SAS device which is newly attached to the controller device.

For any other changes in physical links, the controller firmware may examine each of PHYs to determine a matching SAS address and a matching SAS device 510. It is to be noted that there are various changes in physical links when there is a newly attached end device, a newly attached expander, or the like. In a SAS system, each SAS port is supposed to have a unique SAS address. In an embodiment of the present invention, the PHYs having the same matching SAS address are configured to create a single wide port 512. Next, whether the attached SAS device is an expander or an SAS end device may be determined 514. If the attached SAS device is an expander, whether an expander coupled to the controller in the SAS domain exists may be determined 516. If there is an existing expander having the same SAS address of the controller, a unique SAS address may be assigned to the attached expander 518. In this manner, the method may ensure the newly attached expanders are not part of a topology that joins their domain which violates the SAS specification. If there is not an existing expander having the same SAS address of the controller, the same SAS address of the controller may be assigned to the attached expander 520. In one embodiment of the present invention, the controller firmware assigns the PHY for the expander a unique internal port in case any of expanders in the SAS system has a physical link down. This may ensure that the PHYs for the expander do not become part of any active port when the physical links up.

If the attached SAS device is an end device, the same SAS address of the controller may be assigned to the attached SAS device 520. In one embodiment of the present invention, the attached end device with the controller may make up a SAS domain. Since each end device in a single domain is supposed to have the same SAS address in a SAS system, the same SAS address of the controller may be assigned to the attached end device. In an embodiment of the present invention, the number of SAS devices which can be attached to a controller may be a maximum port width of the controller.

The present invention may provide many useful features. New SAS devices may be attached without any external controller intervention to reconfigure PHYs to match the new SAS devices. As such, the present invention may allow for the flexibility of designing a single initiator solution that can adapt to any number of SAS devices with any number of port widths. Additionally, the present invention allows for a single product to be released that can automatically adjust to a broad range of SAS solutions and SAS topologies.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method of dynamic PHY configuration in a SAS system, comprising:
   initializing a controller device;
   configuring a plurality of PHYs for the controller device to have a single SAS address;
   assigning an internal port to each of the plurality of PHYs;
   enabling each of the plurality of PHYs;
   determining a matching attached SAS device and a matching SAS address for each of the plurality of the enabled PHYs;
   initializing an identify frame for the physical link;
   assigning the single SAS address to the port associated with the physical link, if the port has no device attached;
   determining whether the attached SAS device is an expander or an end device;
   if the attached SAS device is an expander,
      assigning a new SAS address to the attached SAS device if there is an expander having an SAS address of a controller, wherein the new SAS address is assigned to the attached SAS device by firmware of the controller; and
      assigning the SAS address of the controller to the attached SAS device if there is no expander having the same SAS address of the controller, wherein the SAS address of the controller is assigned to the attached SAS device by firmware of the controller;
   if the attached SAS device is an end device,
      assigning the SAS address of the controller to the attached SAS device, wherein the SAS address of the controller is assigned to the attached SAS device via firmware of the controller; and
      making a SAS domain including the attached SAS device and the controller.

2. The method as described in claim 1, the initializing a controller device step further comprising:
   allocating the controller device for each possible port; and
   allocating a unique SAS address to the controller device.

3. The method as described in claim 1, wherein a maximum number of SAS devices which can be attached to the SAS system are determined by a maximum port width of the controller.

4. The method as described in claim 1, wherein the controller assigns a new internal port to the PHYs of the expander when the expander physical link is down.

5. The method as described in claim 1, wherein each port in the SAS domain has a unique SAS address.

* * * * *